United States Patent [19]

Eck et al.

[11] Patent Number: 4,528,315

[45] Date of Patent: Jul. 9, 1985

[54] PROCESS FOR THE PREPARATION OF POLYMER DISPERSIONS AND THEIR APPLICATION

[75] Inventors: Herbert Eck; Manfred Hannebaum; Christof Kemenater, all of Burghausen, Fed. Rep. of Germany

[73] Assignee: Wacker-Chemie GmbH, Fed. Rep. of Germany

[21] Appl. No.: 518,308

[22] PCT Filed: Jun. 9, 1983

[86] PCT No.: PCT/EP83/00149

§ 371 Date: Jul. 20, 1983

§ 102(e) Date: Jul. 20, 1983

[87] PCT Pub. No.: WO84/00369

PCT Pub. Date: Feb. 2, 1984

[30] Foreign Application Priority Data

Jul. 20, 1982 [DE] Fed. Rep. of Germany ....... 3227090

[51] Int. Cl.$^3$ ............................................. C08L 29/04
[52] U.S. Cl. ................................. 524/458; 524/459; 524/503; 524/733; 524/825; 526/202
[58] Field of Search ............... 524/459, 458, 825, 733, 524/503; 526/202

[56] References Cited

U.S. PATENT DOCUMENTS

| | | | |
|---|---|---|---|
| 3,630,976 | 12/1971 | Mathieu | 526/202 |
| 3,843,616 | 10/1974 | Richardson et al. | 526/202 |
| 3,883,489 | 5/1975 | Matschke et al. | 526/202 |
| 3,929,753 | 12/1975 | Itoh et al. | 526/202 |
| 4,093,794 | 6/1978 | Chippaux | 526/202 |
| 4,189,415 | 2/1980 | Eck et al. | 524/459 |

FOREIGN PATENT DOCUMENTS

| | | | |
|---|---|---|---|
| 1076373 | 2/1960 | Fed. Rep. of Germany | 523/346 |
| 48-75486 | 10/1974 | Japan | 524/459 |
| 53-136089 | 11/1978 | Japan | 524/459 |
| 57-212211 | 12/1982 | Japan | 524/459 |

*Primary Examiner*—Joseph L. Schofer
*Assistant Examiner*—N. Sarofim
*Attorney, Agent, or Firm*—Charles A. Muserlian

[57] ABSTRACT

A process for the preparation of aqueous dispersions, also emulsion (co)polymerization of vinyl halides and/or vinyl esters and, if needed, additional monomers in the absence of emulsifying agents are described. Protective colloid is added after the initiation of the polymerization to stabilize the forming dispersion. The dispersions are characterized by low viscosity, even with high solids contents, and low structural viscosity, and they are suitable a.o. especially for the preparation of redispersible powders.

18 Claims, No Drawings

PROCESS FOR THE PREPARATION OF POLYMER DISPERSIONS AND THEIR APPLICATION

The present invention concerns an improved process for the preparation of aqueous polymer dispersions stabilized by a protective colloid, especially by polyvinyl alcohol (PVAL), by one-step radical polymerization of vinyl halides and/or vinyl alkanoates, if needed with other compounds with unsaturated ethylene bonds copolymerizable with the former in amounts of up to 50 percent by weight.

The preparation of aqueous dispersions of polymers of the type mentioned above by emulsion polymerization is known in principle. The dispersing agent needed for the stabilization of the dispersions, namely an emulsifying agent, if needed in combination with a protective colloid, is generally included in the batch for this purpose. (cf. EP-B-No. 590, DE-B-No. 11 80 133 and DE-A-No. 17 70 395).

To achieve special effects (e.g. coarser consistency or bimodal particle size distribution), it has been suggested that the polymerization be started without the emulsifying agent and to add the latter, or the starting materials for its formation, only during the course of the polymerization (cf. DE-B-No. 15 20 849 and DE-A-No. 28 37 992).

There existed the need to develop a process by which dispersions can be prepared which are suitable a.o. for use in the preparation of adhesives, for the coating of paper, textiles, fiber fleeces and similar products, as additive to mortar and concrete mixes and as film-forming components in paints, which are also characterized by low structural viscosity and low viscosity despite high solids contents.

The last-mentioned property is especially advantageous if the preparation of a redispersible powder is intended, since, in this case, even dispersions with a high solids content can be sprayed through jets without any problem. Usually, conventionally prepared dispersions, in which additional protective colloids are included to produce redispersible powders, have a higher structural viscosity because of this addition.

The problems mentioned above can be solved in a surprising manner by the present invention. Furthermore, this new process can also be used to produce dispersions of polymers containing ethylene, which still have a high initial grabbing rate despite contents of ethylene units in the polymer exceeding 10 wt%, even exceeding 15 wt% and also even exceeding 20 wt%, and are therefore still highly suitable as adhesives.

The subject of the invention is a process for the preparation of aqueous polymer dispersions stabilized by a protective colloid, preferably only by protective colloid during the preparation, with solids contents of 20 to 75, preferably 20 to 70, especially 30 to 60 wt%, calculated with respect to the total weight, by one-step polymerization of vinyl halides, preferably of vinyl/chloride and/or of vinyl alkanoates, preferably of vinyl acetate, if needed together with not more than 50 percent by weight, with respect to the monomers that are liquid under the reaction conditions, other compounds with unsaturated ethylene bonds copolymerizable with the former monomers at temperatures of 0° to 120° C., preferably 20° to 100° C., and pressures of up to 200 bar, with the aid of at least partially water-soluble initiator systems and, if needed, in the presence of conventional additives. The process is characterized by the fact that the addition of protective colloid, preferably at least one PVAL with a degree of hydrolysis of 70 to 99.8 mol% and a mean degree of polymerization $\overline{P}_\eta$ of 200 to 3,000, as first dispersing agent, begins only after the conversion of 1 to 60 wt%, preferably 2 to 25 wt%, calculated with respect to the total weight, of the monomers liquid under the reaction conditions.

In a preferred embodiment, 1 to 40 wt%, especially 5 to 30 wt%, of the monomers liquid at under the reaction conditions are initially placed in the reaction vessel. The remaining amounts of these monomers, i.e. 60 to 99 wt%, or especially 70 to 95 wt%, are added during the course of the polymerization, preferably at the rate of their consumption. Here, it was often found advantageous to keep the concentration of these monomers in the reaction mixture, until the completion of the addition, at approx. the same level existing in the initial batch, e.g. 0.2 and 30, preferably 1 to 21, especially 1.5 to 18 wt% (calculated with respect to the total weight of the reaction mixture). But a deviation from this is obviously possible, e.g. when special effects shall be produced.

Included in the "monomers liquid under the reaction conditions" within the scope of this application, are those polymerizable compounds with unsaturated ethylene bonds that can be liquified in the range from 0° to 120° C. and up to 200 bar, or are already liquid. Examples are primarily the vinyl halides such as vinyl fluoride, vinyl bromide, preferably vinyl chloride, as well as the vinyl alkanoates (vinyl esters of saturated straight-chain or branched carboxylic acids, preferably with up to 20 C-atoms) such as vinyl formate, propionate, butyrate, ethylhexanoate, laurate, stearate, isotridecanoate, vinyl esters of Versatic ® acids and preferably vinyl acetate. The sum of these monomers, especially of vinyl chloride and vinyl acetate is at least 50 wt%, preferably at least 80 wt%, of the total amount of the monomers liquid under the given reaction conditions. Also suitable as such monomers besides the mentioned vinyl chloride and vinyl acetate, as well as besides individual, or mixtures of the other vinyl halides and/or alkanoates, are, especially preferably, in amounts of up to 20 wt%:

mono and dialkyl, glycidyl and hydroxyalkyl esters of mono- and dicarboxylic acids with unsaturated ethylene bonds, e.g. esters of (meth)acrylic acid, maleic acid, fumaric acid, crotonic acid and itaconic acid with (un)branched $C_1$- to $C_{20}$-alkanols such as methanol, ethanol, n- and iso-propanol, n-, sec- and tert-butanol, 2-ethylhexanol, octanol, dodecanol, Alfol ®-alcohols, polyalcohols such as ethylene, propylene and butylene glycol and pentaerythritol;

allyl and vinyl esters of (meth)acrylic acid (di)acetoacetic acid;

vinyl and allyl compounds of silanes, glycideyl alcohol, amino alcohols, α-chloroalkyl carboxylic acids, dichlorotriazines;

vinylidene halides such as vinylidene chloride;

acryltrialkoxysilanes;

mono- and dicarboxylic acids with unsaturated ethylene bonds, their anhydrides, their amides and their N-methylolamides, which are, optionally, etherified with (poly)alkoxyl groups (ethoxyl or propoxyl groups), such as (meth)acrylic acid, (meth)acrylamide, N-methylol (meth)-acrylamide, maleic acid anhydride, crotonic acid, crotonic acid amide;

vinyl ether;

vinyl derivatives of heterocyclic compounds, e.g. N-vinylpyridine, and N-vinyl-pyrrolidone;
vinyl sulfonic acid and its salts;
α-olefins, e.g. prolypene, butylene, octene, dodecene.

Monomers with strongly polar groups, e.g. vinyl sulfonate, the carboxylic acids, amides and anhydrides, should be used preferably in the amounts of only up to 5 wt%, especially up to 2 wt%, calculated with respect to the liquid monomers under the reaction conditions.

Di- and polyvinyl and allyl compounds of di- and polycarboxylic acids and phenols as well as vinyl and allyl (meth)acrylate and/or crotonate can be copolymerized in amounts of 0 to 2, preferably up to 0.5, wt%, calculated with respect to the liquid monomers. The monomers from the mentioned groups can be placed separately or as premixes, after the beginning of the addition of protective colloid also as preemulsion, into the reaction vessel, or metered into it. It is possible to place the total or partial amounts of individual monomers from this group in the reaction vessel and to meter the remainder. But the premixing of the desired monomers from the mentioned group and its use as premix, and thus keeping the composition of this monomer phase largely constant for a relatively long time during the reaction, is often preferred for the sake of simplicity.

In addition to the mentioned monomers, ethylene is also used as comonomer in another preferred embodiment of the process according to the invention. For this purpose, a partial pressure of up to 200 bar, preferably up to 80 bar of ethylene is applied to the reaction vessel either before or also during the reaction. The pressure is applied preferably before the reaction, in order that the liquid reaction mixture can dissolve part of the ethylene until the equilibrium between the gas volume and the liquid phase has been established. The ethylene can be added in one operation, or its partial pressure can be kept largely constant over a relatively long time, partially to the end of the metering of the monomers that are liquid under the reaction conditions.

The process according to the invention allows the incorporation of larger amounts of ethylene in the polymer than previously possible with the existing processes, even in the presence of higher concentrations of monomers that are liquid under the reaction conditions, i.e. more than 15 or even more than 25 wt%, calculated with respect to the total weight of the reaction mixture. For example, preferred polymers with a content of units that are not derived from vinyl chloride, vinyl acetate and/or ethylene of not more than 20 wt% can be produced. The content of ethylene units in these may amount to up to 45 wt%, preferably 5 to 30 wt%, calculated with respect to the polymer. The monomers that are liquid under the reaction conditions react practically quantitatively. Furthermore, the particle size distribution of the forming dispersions can be controlled in a simple way through the time and amount of the first addition of protective colloid. Also, the polymerization rate can be accelerated since a faster removal of the heat of reaction is possible due to the lower viscosity.

This lower viscosity of dispersions prepared according to the invention, even at high solids contents, is especially surprising since it is known that the viscosity of aqueous dispersions can be increased by the addition of protective colloids. Another advantage of the process according to the invention is the fact that when preferably using the dispersions prepared according to the invention for the production of redispersible powders, e.g. for use in the building sector as adhesive or additive for hydraulically setting masses, more free protective colloid is present at the end of the polymerization because of the lower rate of grafting of the protective colloid, especially of the polyvinyl alcohol (PVAL). This eliminates, at least partially, the need for the further addition of protective colloid, especially PVAL, during or after drying.

Used as protective colloids are those generally suitable for polymerization, e.g. cellulose derivatives or water-soluble polymers such as partially saponified polyvinyl acetate or vinyl pyrrolidone polymers. Preferred is at least one polyvinyl alcohol with a degree of hydrolysis of 70 to 99.8 mol% (corresponding to a saponification number of approx 10 to approx. 257), preferably 74 to 99.5 mol% (corresponding to a saponification number of approx. 20 to approx. 240) and with a mean degree of polymerization of 200 to 3,000 (corresponding to a Höppler viscosity of approx. 3 to approx. 50 m.Pas of a 4 wt% aqueous solution at 20° C.). The protective colloid, especially the PVAL, is added in total amounts of 0.5 to 15 wt%, preferably of 3 to 10 wt%, calculated with respect to the monomers that are liquid under the reaction conditions. When additional comonomers are used that are known to stabilize the dispersion (e.g. vinyl sulfonate), even the addition of approx. 1 to 3 wt/% of protective colloid can produce very good results.

Of course, the use of mixtures of various different protective colloids is possible, e.g. mixture of PVAL's of higher and lower viscosity, or higher or lower degrees of saponification. It is also possible to add one (or several) of these protective colloids earlier and (one) several other(s) later. It should also be mentioned that polymers generally have a certain range of composition, e.g. a given PVAL, characterized by the properties above, does not consist of a single species of molecules only.

The polymerization is performed preferably with so-called redox initiator systems, which generally consist of a combination of at least one peroxide compound and at least one reducing agent. One of these components can be placed in the reaction vessel in its entirety or partly, the other component and, optionally, the rest of the components, part of which has been initially placed or, if needed, both components, are then metered during the course of the polymerization. For example, the oxidation component can be placed in the reaction vessel, and the polymerization is controlled by the metering of the reducing component. This is generally the preferred practical application.

Approximately 0.01 to approx. 0.5 wt%, preferably 0.03 wt%, of reducing component and approx. 0.01 to approx. 2 wt%, preferably 0.03 to 0.8 wt%, of oxidizing component are generally needed, and particularly good results are often obtained when the molar ratio of oxidizing to reducing component is 0.5 to 4. The percentages given above are calculated with respect to the total weight of the monomers that are liquid under the reaction conditions.

Preferred examples of the oxidizing component are the following peroxide compounds:

Ammonium and potassium persulfate and peroxodisulfate, hydrogen peroxide, alkyl hydroperoxides such as tert-butyl hydroperoxide, peroxodiphosphates such as potassium-, sodium- and ammonium peroxodiphosphate as well as their mixtures.

To be mentioned as preferred examples of the reducing component are compounds of sulfur in which the sulfur is not present in its formal degree of oxidation of +6. Especially mentioned are: water-soluble sulfites and sulfoxylates such as alkali (Na, K) or ammonium sulfite or hydrogen sulfite or alkali (Na, K) or zinc formaldehyde sulfoxylate. Equally suitable are hydrogen/precious metal catalyst components with the concurrent use of small amounts of salts of heavy metals as activators.

Suitable initiator systems are described, a.o., in "Fundamental Principles of Polymerization" by G. F. Alelio, John Wiley and Sons Inc. New York, 1952, pages 333 ff and in the DE-B-No. 11 33 130.

The use of radical initiators, e.g. the persulfates or peroxodiphosphates, is principally possible in the absence of a reducing agent. In this system as well as in those previously mentioned, traces of salts of suitable heavy metals e.g. iron or copper, preferably, are added by a well-known method.

After the polymerization, possibly (at the most) also at the end of the polymerization, e.g. for the post polymerization, anionic and/or nonionogenic emulsifying agents can be added, if wanted, in amounts of 0 to 4 wt%, preferably up to 2 wt%, calculated with respect to the solids content of the dispersion.

Mentioned as examples are: alkaline or alkaline earth salts of alkylated benzene- and naphthalinesulfonic acids such as sodium benzylsulfonate, alkali alkyl sulfonates such as sodium lauryl sulfonate, sodium dodecyl sulfonate, salts of the alkyl sulfuric acids such as sodium lauryl sulfate, also sodium alkyl sulfosuccinate or mono- and diesters of sodium alkyl sulfosuccinate, sodium or ammonium salts of sulfate esters of alkyl phenoxipoly (ethoxylene) ethanols, such as octyl- or iso-nonyl phenoxipoly (ethoxylene) ethanols, as well as their ethoxylated products, ethylene oxide adducts of alkyl glycols and alkyl phenols, block copolymers of ethylene oxide and propylene oxide as well as sulfonated fatty acid amides, and ethylene oxide addition products with fatty alcohols or fatty amines.

The process according to the invention is performed preferably at a pH of 2.5 to 7. But this range may be extended, if necessary. The usual buffer substances, e.g. bicarbonates, borates, acetates, citrates, mixtures of primary and secondary phosphates of the alkali metals, may also be added to stabilize the pH.

The process according to the invention is performed preferably by the metering method, but the entire amount of monomers can be placed in the reaction vessel. When using the metering method, at least one monomer may be placed in the reaction vessel, either in its entirety or partly, while the others are metered in their entirety, including, if needed, the remainder of the partially batched monomers.

Since conversions are frequently difficult to measure in practice, preferably the addition of protective colloid begins at the earliest at a solids content of 2 wt%, preferably 5 wt%, for the dispersion (which is easily determined), and at the latest at a solids content of 40 wt%, better 30 wt%, especially 20 wt%.

The dispersions prepared by the process according to the invention are suitable as adhesives, for the coating of paper, cloth and fleeces of natural or synthetic fibers, fiberglass, wood fibers etc., as additive or as binder in concrete and mortar mixes.

The following examples serve to explain the invention. The results of the examples and comparison tests are compiled in the added tables. Unless otherwise stated, the percentages are always percent by weight and are calculated with respect to (a) the total weight of the monomers that are liquid under the reaction conditions
(b) the solids content
(c) the total weight of the dispersion.

The viscosities of the PVAL's in m.Pas were determined according to Höppler, as mentioned above; those of the dispersions, with the Epprecht rheometer, with the measuring unit always given in ( ).

Pressures were recorded only when the initial pressure was greater than the pressure of the surrounding atmosphere.

GENERAL DESCRIPTION OF THE CONDUCTED EXAMPLES ACCORDING TO THE INVENTION

Part of the water, a trace iron ammonium sulfate and part of the, optionally, premixed liquid monomers (cf. table) were transferred to the evacuated and $N_2$-rinsed autoclave, and heated to the desired temperature. Then, optionally, ethylene was added with pressure until the initial pressure recorded in the tabe was reached, and the polymerization was started by adding the catalyst solutions with metering. Equal volumes of aqueous solutions of ammonium (or potassium) persulfate and sodium formaldehyde sulfoxylate were used for the experiments recorded in the tables. The concentration of the persulfate solutions was twice that of the sulfoxylate. The pH was maintained between 2.5 to 5 by the addition of ammonia. The metering of the polyvinyl alcohol solutions was started approx. 30 minutes after the beginning of the reaction, at solids contents of approx. 2 to approx. 20 wt%. Monomer metering began another 30 to 45 minutes later.

When the maximal solids content was reached, usually one hour after the completion of the metering, the post-polymerization was allowed to continue for two hours, if wanted, the pH was adjusted to 7 and the pressure on the dispersion was released, and the remaining monomers were removed from the dispersion by evacuation. Optionally, an emulsifying agent was added after the completion of the polymerization. General Description for the Conducted Comparison tests (identified by letters)

Part of the water, a trace of iron ammonium sulfate, some potassium persulate, the polyvinyl alcohol and, optionally, the emulsifying agent (cf. table) were placed in the evacuated and $N_2$-rinsed autoclave and heated to the temperature recorded in the table. Then, part of the monomers (cf. table) was added with agitation, optionally, ethylene was added under pressure until the desired pressure was reached, and the polymerization was started by the addition of equal volumes of aqueous solutions of ammonium (or potassium) persulate and sodium formaldehyde sulfoxylate. The concentration of the persulfate solution was twice that of the reducing agent solution.

The pH was maintained between 2.5 and 5 by the addition of ammonia or formic acid. The metering of the remaining monomer quantities was performed in a continuous operation, analgous to the instructions above.

When the maximal solids content was reached, usually 3 to 9 hours after the completion of the metering, the post-polymerization was continued for 2 hours, the pH was adjusted to 7, if needed, and the pressure was lowered, if needed, and the remaining monomers were removed from the dispersion by evacuation.

TABLE

| Example/Comparison test | | A | 1 | B | 2 | C | 3 |
|---|---|---|---|---|---|---|---|
| (1) monomer charge, % (a) | | 100 | 21 | 5 | 5 | 21.3 | 21.3 |
| (2) reaction temperature, °C. | | 45 | 45 | 55 | 55 | 40 | 40 |
| (3) pressure, bar (ethylene) | | 28 | 28 | — | — | 55 | 55 |
| (4) protective colloid PVAL: viscosity, m Pas/saponification number/ % (a) | 1. 2. 3. | 25/140/2.05 5/140/4.7 | 25/140/2.05 5/140/4.7 | 4/140/5.9 | 4/140/7.1 | 28/60/2.5 13/140/2.5 5/140/3.2 | 28/60/3.8 13/140/5.8 |
| emulsifying agents type/ % (b) | | | | | | | |
| (5) Arcopal(R) N230 | | | | | | | |
| (6) Genapol(R) X150 | | | | | | | 1.0 |
| Dispersion: | | | | | | | |
| (7) solids content, % (c) | | 55 | 55.2 | 48.2 | 50.2 | 50.1 | 50.3 |
| (8) pH | | 3.5 | 7.6 | 3.5 | 6.2 | 7.6 | 6.2 |
| (9) viscosity, m Pas | | 3500(CIII) | 930(CIII) | 222(BIII) | 222(BIII) | 7665(DIII) | 3020(CIII) |
| (10) structural viscosity | | 1.80 | 0.59 | not measurable | 0.11 | 3.24 | 1.80 |
| (11) particle size, μm | | 0.5–1.0 | 0.16–0.90 | | 0.20–0.48 | 0.18–0.74 | 0.12–0.75 |
| (12) initial grabbing rate, s | | 2.5 | 1.6 | highly rheopex | 2.9 | 2.7 | 2.4 |

| Example/Comparison trial | A | 1 | B | 2 | C | 3 |
|---|---|---|---|---|---|---|
| Polymer always in % (b) | | | | | | |
| (13) vinyl chloride | | | | | 65.7 | 55.9 |
| (14) vinyl acetate | 83.1 | 83.1 | 94.4 | 93.4 | 11.6 | 18.6 |
| (15) ethylene | 11.3 | 11.3 | | | 16.4 | 17.4 |
| (16) hydroxypropyl acrylate | | | | | | |
| (17) acrylamide/acrylic acid | | | | | | |
| (18) ethylhexyl acrylate | | | | | | |
| (19) vinyl sulfonate | | | | | | |
| (20) polymerization time, hr. | ~8 | 11.5 | ~3 | ~3 | 19.5 | 16.5 |
| (21) start of protective colloid metering at solids content, % (c) | — | 12.8 | — | 17.3 | — | 11.2 |
| (22) lowest film formation temperature (°C.) | 3 | 3 | 21 | 17 | 18 | 9 |
| (23) glass transition temperature (°C.) | — | — | — | — | 24.3 | 18.3 |

| Example/Comparison trial | D | 4 | E | 5 | 6 | 7 |
|---|---|---|---|---|---|---|
| (1) | 21.1 | 21.1 | 20 | 20 | 22.5 | 20.9 |
| (2) | 40 | 40 | 43 | 43 | 45 | 43 |
| (3) | 50 | 50 | 55 | 55 | 46 | 55 |
| (4) | 28/60/8.95 | 28/60/9.0 | 4/140/3.7 28/60/3.7 | 4/140/3.6 28/60/3.6 | 4/140/5.9 5/240/2.5 | 4/140/7.4 |
| (5) | | | | | | |
| (6) | 0.25 | 0.25 | | | | |
| (7) | 46.5 | 49.5 | 50 | 51 | 51.6 | 63.7 |
| (8) | 6.5 | 6.6 | 6.6 | 6.1 | 8.6 | 6.3 |
| (9) | | 5147(DIII) | 10220(DIII) | 1379(CIII) | 320(BIII) | 1633(CIII) |
| (10) | Batch had to be stopped; could no longer be agitated | 1.82 | 2.33 | 2.27 | 0.81 | 1.07 |
| (11) | | 0.26–0.66 | 0.30–1.05 | 0.20–0.58 | 0.18–0.74 | 0.27–1.32 |
| (12) | | 2.1 | >4 | 1.5 | 2.1 | 1.8 |
| (13) | 59.1 | 58.9 | 55.3 | 55.9 | 52.0 | 48.3 |
| (14) | 19.7 | 19.5 | 18.4 | 18.6 | 23.7 | 26.0 |
| (15) | 13.9 | 14.3 | 20.9 | 20.1 | 17.9 | 20.3 |
| (16) | | | | | | |
| (17) | | | | | | |
| (18) | | | | | | |
| (19) | | | | | | |
| (20) | 17.2 | 16.5 | 17.25 | 14.25 | 11.75 | 14.75 |
| (21) | — | 10.5 | — | 7.2 | 8.2 | 9.8 |
| (22) | — | 21 | 8.5 | 9 | <0 | 3 |
| (23) | 26.3 | 23.5 | 12.1 | 13.8 | 16 | 4.4 |

| Example/Comparison trial | 8 | 9 | 10 | 11 | F | 12 |
|---|---|---|---|---|---|---|
| (1) | 21.1 | 23 | 22.5 | 4.4 | 21.3 | 21 |
| (2) | 43 | 43 | 43 | 43 | 50 | 43 |
| (3) | 50 | 55 | 55 | 55 | 50 | 55 |
| (4) | 12/140/3.4 | 4/140/6.1 | 4/140/3.8 28/60/3.8 | 4/140/3.6 28/60/3.6 | 28/60/2.6 | 4/140/4.3 |
| (5) | | | | | 1.38 | 1.95 |
| (6) | 1.35 | | | | | |

TABLE-continued

|      | | | | | | |
|------|------|------|------|------|------|------|
| (7)  | 51 | 52 | 54.9 | 50.6 | 50.3 | 71.4 |
| (8)  | 8.5 | 6.8 | 7.1 | 7.1 | 6.6 | 6.0 |
| (9)  | 213(BIII) | 213(BIII) | 5475(DIII) | 2615(CIII) | 310(BIII) | 11899(DIII) |
| (10) | 0.87 | 1.31 | 2.04 | 0.81 | 1.79 | 2.15 |
| (11) | 0.24–0.82 | 0.28–0.52 | 0.22–1.02 | 0.075–0.43 | 0.25–1.175 | |
| (12) | 3.1 | 2.2 | 2.0 | 2.2 | 3.0 | 4 |
| (13) | 57.9 | 45.1 | 57.3 | 57.8 | 58.8 | 63.0 |
| (14) | | 24.3 | 12.9 | 19.3 | 19.6 | 21.0 |
| (15) | 18.8 | 23.3 | 23.4 | 17.1 | 18.1 | 16.0 |
| (16) | | 1.36 | AAA:1.0 | AMA:0.2 | | |
| (17) | | 0.75/0.75 | | | | |
| (18) | 19.3 | | | | | |
| (19) | 0.07 | | | | 0.08 | |
| (20) | 14.5 | 14.5 | 14.5 | 12.5 | 12.25 | 15.5 |
| (21) | 12 | 10.5 | 10 | 11 | — | 13 |
| (22) | 1 | 0 | 11.5 | 13.5 | 12 | 17.5 |
| (23) | — | 4.8 | 9 | 20 | 18.6 | 20.3 |

AAA = allylacetyl acetate
AMA = allyl methacrylate

We claim:

1. In a process for the preparation of aqueous polymer dispersions with solids contents of 20 to 75 wt%., calculated with respect to the total weight, which are stabilized by a protective colloid, by single-step polymerization of vinyl halides and/or vinyl alkanoates, together with 0 to 50 wt%., calculated with respect to the total weight of the monomers that are liquid under the reaction conditions, of other copolymerizable compounds containing unsaturated ethylene bonds, at temperatures of 0° to 120° C. and pressure of up to 200 bar, with the aid of at least partly water-soluble radical initiator systems, the improvement comprising the metering of protective colloid as first dispersing agent begins only after a conversion of 1 to 60 wt%., calculated with respect to the total weight of the monomers that are liquid under the reaction conditions.

2. Process according to claim 1, characterized by the fact that at least one polyvinyl alcohol with a degree of hydrolysis of 70 to 99.8 mol% and a mean degree of polymerization of 200 to 3,000 is used as protective colloid.

3. Process according to claim 1, characterized by the fact that protective colloid is used in amounts of 0.5 to 15 wt%, calculated with respect to the monomers that are liquid under the reaction conditions.

4. Process according to claim 1, characterized by the fact that 1 to 40 wt% of the monomers that are liquid under the reaction conditions are initially placed in the reaction vessel and that the rest is added by metering.

5. Process according to claim 1, chaaracterized by the fact that not more than 20 wt% of additional comonomers that are liquid under the reaction conditions are also used.

6. Process according to claim 1, characterized by the fact that ethylene is used in addition as comonomer, preferably at partial pressures of up to 80 bar.

7. Process according to claim 2, characterized by the fact that protective colloid is used in amounts of 0.5 to 15 wt%, calculated with respect to the monomers that are liquid under the reaction conditions.

8. Process according to claim 2, characterized by the fact that 1 to 40 wt% of the monomers that are liquid under the reaction conditions are initially placed in the reaction vessel and that the rest is added by metering.

9. Process according to claim 3, characterized by the fact that 1 to 40 wt% of the monomers that are liquid under the reaction conditions are initially placed in the reaction vessel and that the rest is added by metering.

10. Process according to claim 2, characterized by the fact that not more than 20 wt% of additional comonomers that are liquid under the reaction conditions are also used.

11. Process according to claim 3, characterized by the fact that not more than 20 wt% of additional comonomers that are liquid under the reaction conditions are also used.

12. Process according to claim 4, characterized by the fact that not more than 20 wt% of additional comonomers that are liquid under the reaction conditions are also used.

13. Process according to claim 2, characterized by the fact that ethylene is used in addition as comonomer, preferably at partial pressures of up to 80 bar.

14. Process according to claim 3, characterized by the fact that ethylene is used in addition as comonomer, preferably at partial pressures of up to 80 bar.

15. Process according to claim 4, characterized by the fact that ethylene is used in addition as comonomer, preferably at partial pressures of up to 80 bar.

16. Process according to claim 5, characterized by the fact that ethylene is used in addition as comonomer, preferably at partial pressures of up to 80 bar.

17. An adhesive containing an aqueous polymer dispersion prepared by the process of claim 1.

18. The process of claim 1 wherein the dispersions contain conventional additives.

* * * * *